(12) United States Patent  (10) Patent No.: US 7,401,577 B2
Saucedo et al.  (45) Date of Patent: Jul. 22, 2008

(54) REAL TIME OPTIMIZATION AND CONTROL OF OXYGEN ENHANCED BOILERS

(75) Inventors: Victor Saucedo, Willowbrook, IL (US); Ovidiu Marin, St. Cloud (FR)

(73) Assignee: American Air Liquide, Inc., Fremont, CA (US)

( * ) Notice: Subject to any disclaimer, the term of this patent is extended or adjusted under 35 U.S.C. 154(b) by 931 days.

(21) Appl. No.: 10/779,479

(22) Filed: Feb. 13, 2004

(65) Prior Publication Data

US 2004/0231332 A1  Nov. 25, 2004

Related U.S. Application Data

(60) Provisional application No. 60/456,002, filed on Mar. 19, 2003.

(51) Int. Cl.
  *F22D 5/00* (2006.01)
(52) U.S. Cl. ..................... 122/448.1; 110/234
(58) Field of Classification Search .............. 122/448.1, 122/448.3, 406.1, 4 D; 110/345, 234
  See application file for complete search history.

(56) References Cited

U.S. PATENT DOCUMENTS

| | | | |
|---|---|---|---|
| 4,027,145 A | | 5/1977 | McDonald et al. |
| 4,362,269 A | | 12/1982 | Rastogi et al. |
| 4,457,266 A | * | 7/1984 | La Spisa ................... 122/451.1 |
| 4,497,283 A | * | 2/1985 | LaSpisa et al. ............ 122/451.1 |
| 4,619,224 A | | 10/1986 | Takita et al. |
| 4,622,922 A | | 11/1986 | Miyagaki et al. |

(Continued)

FOREIGN PATENT DOCUMENTS

GB  893251 A  4/1962

(Continued)

OTHER PUBLICATIONS

May 27, 2004, International Search Report.

*Primary Examiner*—Gregory A Wilson
(74) *Attorney, Agent, or Firm*—Elwood Haynes (57) ABSTRACT

An oxygen enriched boiler having a burner subassembly and a steam subassembly is disclosed. The burner subassembly has a fuel inlet, an oxidant inlet, a combustion chamber, a flue gas composition detector and a flue gas outlet. The fuel inlet provides fuel to the combustion chamber, the oxidant inlet provides an oxygen-enriched inlet stream to the combustion chamber, the combustion chamber burns the fuel and the flue gas composition detector measures at least one characteristic of the flue gas. The steam subassembly has a supply water inlet, a heat exchange zone, a water drum, a steam quality actuator and a steam outlet. The supply water inlet provides feed water to the heat exchange zone, the heat exchange zone transfers heat generated by combustion of the fuel to the water to generate steam, the water drum receives the heated water and steam from the heat transfer zone and maintains the water and steam at a selected steam pressure and water level, and the steam quality actuator regulates at least one characteristic of the steam. Flue gas characteristics, as well as other boiler performance variables, are monitored. At least one controller actuates on the oxidant injections to control combustion. The controller calculates the optimum oxidant distribution in real-time for a series of injection points to minimize undesired flue gas emissions while maintaining the desired steam conditions and boiler operating conditions.

16 Claims, 7 Drawing Sheets

U.S. PATENT DOCUMENTS

| | | |
|---|---|---|
| 4,707,778 A | 11/1987 | Yamada et al. |
| 5,052,310 A | 10/1991 | Goff et al. |
| 5,688,296 A | 11/1997 | Andrus, Jr. et al. |
| 5,762,008 A | 6/1998 | Martin et al. |
| 5,943,865 A * | 8/1999 | Cohen .................. 60/653 |
| 6,093,372 A | 7/2000 | Wallace et al. |
| 6,507,774 B1 | 1/2003 | Reifman et al. |
| 6,520,122 B2 * | 2/2003 | Kemp et al. ............ 122/504.2 |
| 6,918,356 B2 * | 7/2005 | Rowe et al. ............ 122/448.1 |
| 2002/0192609 A1 | 12/2002 | Havlena |
| 2003/0000436 A1 | 1/2003 | Havlena |
| 2003/0014131 A1 | 1/2003 | Havener et al. |

FOREIGN PATENT DOCUMENTS

| | | |
|---|---|---|
| JP | 59157420 | 6/1984 |

* cited by examiner

REAL TIME OPTIMIZATION AND CONTROL OF OXYGEN ENHANCED BOILERS

CROSS REFERENCE TO RELATED APPLICATION

This application claims the benefit of U.S. Provisional Application No. 60/456,002, filed Mar. 19, 2003.

BACKGROUND OF THE INVENTION

1. Field of the Invention

This invention relates to the field of control of oxygen enhanced boilers. A method for controlling emissions in a boiler delivering a controlled steam output is disclosed. One or more oxygen enriched oxidant streams are introduced into the combustion chamber. The flue gas characteristics, as well as other boiler performance variables, are monitored. At least one controller actuates on the oxidant injections to control combustion. The controller calculates the optimum oxidant distribution in real-time for a series of injection points to minimize undesired flue gas emissions while maintaining the desired steam conditions and boiler operating conditions. Due to the multivariable nature of the boiler and its complexity, the controller can be a multivariable advanced controller. The controller can be adapted as a retrofit, by integration with existing control technology, or it can be installed as an integral unit in a new application. A real time optimizer is continuously calculating the optimum set points for the controller.

2. Related Art

In a combustion process for steam generation, a fuel-fired boiler delivers steam at constant temperature and pressure and at user-defined demands. In order to achieve these requirements, the boiler consists of a variety of control (output) variables and manipulating (input) variables. The most common control (output) variables are the steam mass flow rate, the water level in the drum, the steam pressure in the drum, the boiler pressure and the gas composition of the flue gases. Meanwhile, the typical manipulating (input) variables are the fuel flow rate, the oxidant flow rate, the feed water flow rate and the flue gas fan. As can be seen, the control and manipulating variables are the same or similar regardless of the fuel type; coal-fired boilers represent just an example of the technology.

A typical boiler control system has a burner subassembly and a steam subassembly. In the boiler, fuel is mixed with an oxidant to burn and generate heat to be transferred to feed water to create steam. The amount of steam required is quickly varied by an actuator valve; however, replenishment of the steam is typically more slowly accomplished by varying the combustion rate. Oxygen in the flue gas is measured so that a pre-selected range of excess oxygen in the flue gas is maintained; the oxidant input is varied to ensure good combustion and provide the amount of oxygen necessary to achieve the pre-selected range of excess oxygen in the flue gas. Adequate pressure in the boiler is maintained, and the pressure in the water drum ensures the quality of steam delivered.

Thus, the typical approach to boiler control employs dedicated controllers for each subassembly. Often, steam subassembly control is provided by controlling the steam flow rate using a steam valve. Pressure in the drum is controlled with the fuel flow rate and compensated by the steam flow rate. The water level in the drum is controlled by the feed water valve and also compensated by the steam flow rate. The pressure in the boiler is controlled by the draft created by the flue gas fan. Simultaneously, burner control is provided by monitoring the oxygen excess in the flue gases and manipulating the flow rate of the oxidant, thereby controlling the stoichiometry of the combustion.

In U.S. Pat. No. 5,688,296, a control system for an integrated gasification combined cycle steam system (IGCC) locally in the gasifier and globally in the cycle is disclosed. Information from on-line gas analyzers is not utilized in the control. In U.S. patent application Nos. 2002/0192609 A1 and U.S. application No. 2003/0000436 A1, real-time flue gas concentrations are monitored and the data used to adjust the air-to-fuel ratio and increase combustion efficiency. This is extended to use a model based predictive control to control the flue gas concentrations while using the smallest amount of air while including secondary and tertiary air supplies. U.S. patent application No. 2003/0014131 A1 uses the inputs and outputs of a boiler to create a steady state model. The values are then optimized to find the optimum input to the plant. The static model is converted into a dynamic model and then the multivariable problem is executed.

In U.S. Pat. No. 6,507,774, a steady-state neural network model and a nonlinear optimization are disclosed. Steady state fuel conditions are controlled to optimize operating conditions, but the system cannot accommodate dynamic operating conditions. In U.S. Pat. No. 6,093,372, control of oxygen supply in a gasifier based on on-line sensors for gas products is disclosed.

However, nothing in the art discloses a controller for optimizing oxidant distribution in real-time for a series of injection points to minimize undesired flue gas emissions while maintaining the desired steam conditions and boiler operating conditions. Thus, process control by oxygen enrichment in a variety of injection points in boilers to minimize the pollutant concentrations in the flue gas while simultaneously maintaining the required steam properties and the desired load and continuously updating the conditions that make the boiler operate at the maximum efficiency is not disclosed. The present application discloses applying oxygen-enriched inputs in boilers that use on-line flue gas measurements and an advanced multivariable controller supplying oxygen rich inputs in a plurality of inputs.

Thus, a problem associated with boilers that precede the present invention is that they do not provide oxygen enrichment of the combustion process while at the same time providing adjustment of the steam generation process to accommodate changing characteristics of the boiler.

Yet another problem associated with boilers that precede the present invention is that they do not provide control of the combustion process to reduce $NO_x$ and other undesired combustion by-products while at the same time providing optimal steam generation control.

Still another problem associated with boilers that precede the present invention is that they do not provide integration of combustion control with steam generation control to accommodate varying conditions in the combustion process and their consequent effects on the characteristics of the boiler operation.

Another problem associated with boilers that precede the present invention is that they cannot be readily adapted to retrofit existing boilers with oxygen enhancement for the combustion and simultaneously provided with integrated control of the combustion process and the steam generation process.

For the foregoing reasons, there has been defined a long felt and unsolved need for a boiler that overcomes the aforementioned problems and provides an economical, reliable boiler control system that can be either retrofitted to existing equipment or designed into new construction.

SUMMARY OF THE INVENTION

The preferred embodiment of the present invention is adaptable to retrofit or new construction in boilers to provide oxygen enhancement to assist the combustion process and reduce undesired $NO_x$ and other combustion by-products while at the same time providing boiler control that reacts to changes in the boiler characteristics brought on by the oxygen enhancement. While some burners include on-line flue gas analyzers to operate within environmental restrictions, the preferred embodiment of the present invention discloses real-time control of boilers using real-time flue gas measurements and manipulating oxygen enriched injections. The injections can occur in multiple points, so the controller calculates the optimum real-profile of inputs to minimize the flue gas contaminations while maintaining the steam quality and load. As fuel properties and the boiler's performance change due to the adjustments in the oxidant streams, the boiler characteristics change, and update of the optimum operating points is continuously provided.

One preferred embodiment discloses the method of controlling the oxygen-enhanced combustion of a coal-fired boiler. Coal combined with an oxidant is supplied to a coal-fired boiler. This injection is known as primary oxidant or primary air. An additional oxygen enhanced injection is supplied to improve the performance of the boiler. This injection can be disposed in one or more points and is known as secondary and tertiary oxidant or secondary or tertiary air, and so on. The concentrations in the flue gas are monitored on-line and this information sent to a controller. The controller monitors the flue gas concentrations and calculates the amount of feeds to maintain the efficiency of the boiler while minimizing the concentration of pollutants in the flue gas. The controller is capable of rejecting all types of short and long-term disturbances that can be affecting the properties of the coal injected in and the operational drifts of the boiler. In addition, the controller calculates the correct manipulations to operate under desired load changes.

Thus, it is an object of the present invention to provide oxygen enrichment of the combustion process while at the same time providing adjustment of the steam generation process to accommodate changing characteristics of the boiler.

Yet another object of the present invention is to provide control of the combustion process to reduce $NO_x$ and other undesired combustion by-products while at the same time providing optimal steam generation control.

Still another object of the present invention is to provide integration of combustion control with steam generation control to accommodate varying conditions in the combustion process and their consequent effects on the characteristics of the boiler operation.

Another object of the present invention is that it can be readily adapted to retrofit existing boilers with oxygen enhancement for the combustion and simultaneously provided with integrated control of the combustion process and the steam generation process.

These and other objects, advantages and features of the present invention will be apparent from the detailed description that follows.

BRIEF DESCRIPTION OF THE DRAWINGS

In the detailed description that follows, reference will be made to the following figures.

DESCRIPTION OF PREFERRED EMBODIMENTS

Figure 1:
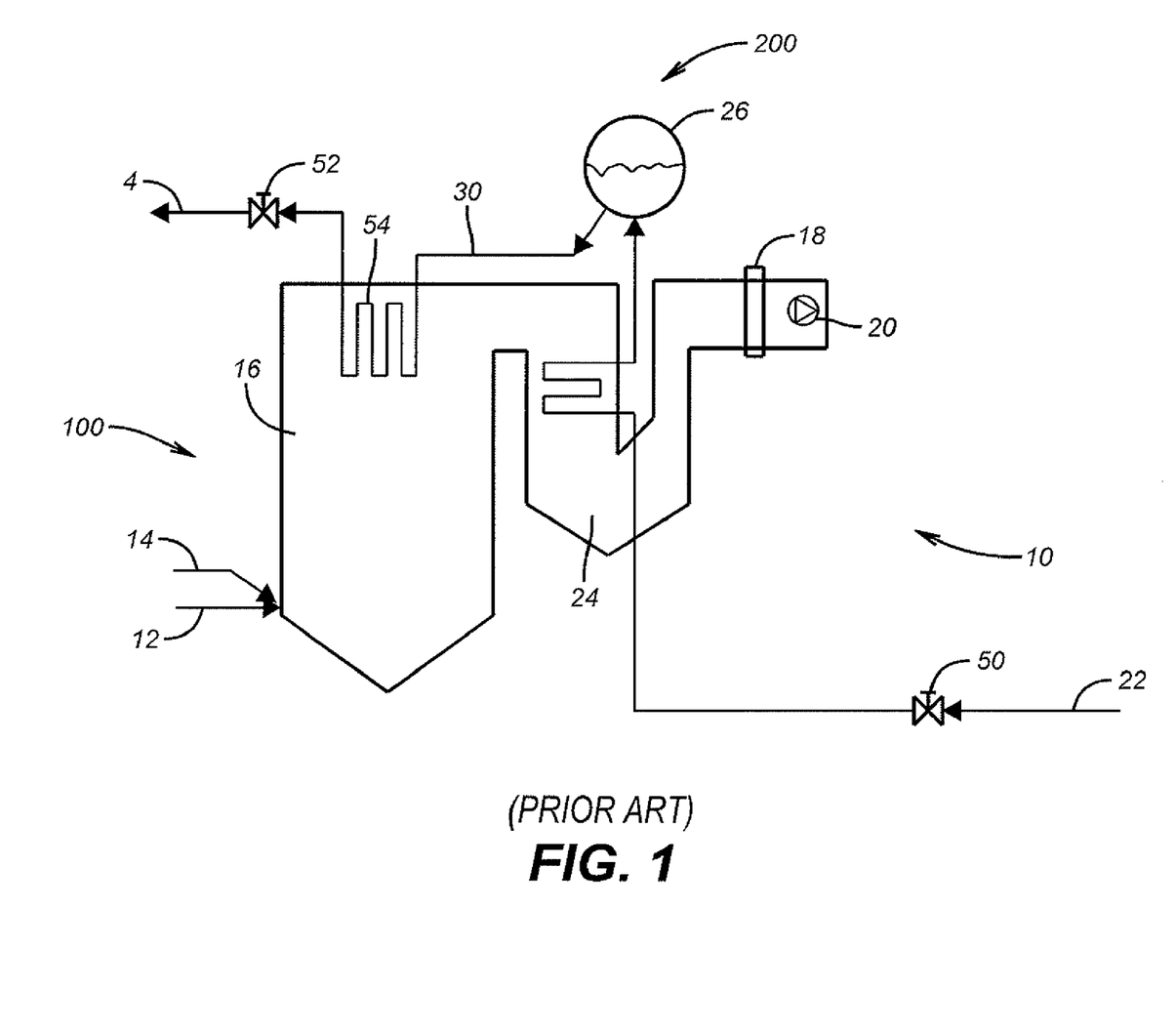
FIG. 1 is a schematic illustration showing a typical boiler.

As shown in FIG. 1, a boiler 10 having a burner subassembly 100 and a steam subassembly 200 is disclosed. The burner subassembly 100 has a fuel inlet 12, an air inlet 14, a combustion chamber 16, a flue gas composition detector 18 and a flue gas outlet 20. The steam subassembly has a supply water inlet 22, a heat exchange zone 24, a water drum 26, and a steam outlet 30. Valve 50 acts as an actuator to control the water flow into the heat exchange zone 24 and valve 52 acts as an actuator to control the steam flow out of the outlet 30. A secondary heat exchange zone 54 can be located to capture additional heat from the flue gas and transfer it to the steam. Referring in more detail to the combustion aspects of a preferred embodiment, as shown in FIG. 3, a first preferred embodiment illustrates an oxygen enriched burner subassembly 100. The burner subassembly 100 has a fuel inlet 12, multiple oxidant inlets 14, a combustion chamber 16, a flue gas composition detector 18 and a flue gas outlet 20. The fuel inlet 12 provides fuel to the combustion chamber 16, the oxidant inlets 14 provide oxygen-enriched inlet stream to the combustion chamber 16, the combustion chamber 16 burns the fuel and the flue gas composition detector 18 measures at least one characteristic of the flue gas. Combustion characteristics of the flue gas to be measured are generally known in the art, and include, but are not limited to, $O_2$, $NO_x$, $SO_x$, $H_2O$, $CO$, $CO_2$ and $T_{fg}$ (temperature), as well as others from which one or more of the foregoing can be deduced. In the case of combustion in the presence of oxygen-enriched air or other oxygen-bearing (oxidant) stream bearing an excess of $O_2$, it is desirable to maintain an $O_2$ level in the flue gas of approximately 3%. The combustion controller 38 (FIG. 2) can be set to accomplish this.

Figure 2:
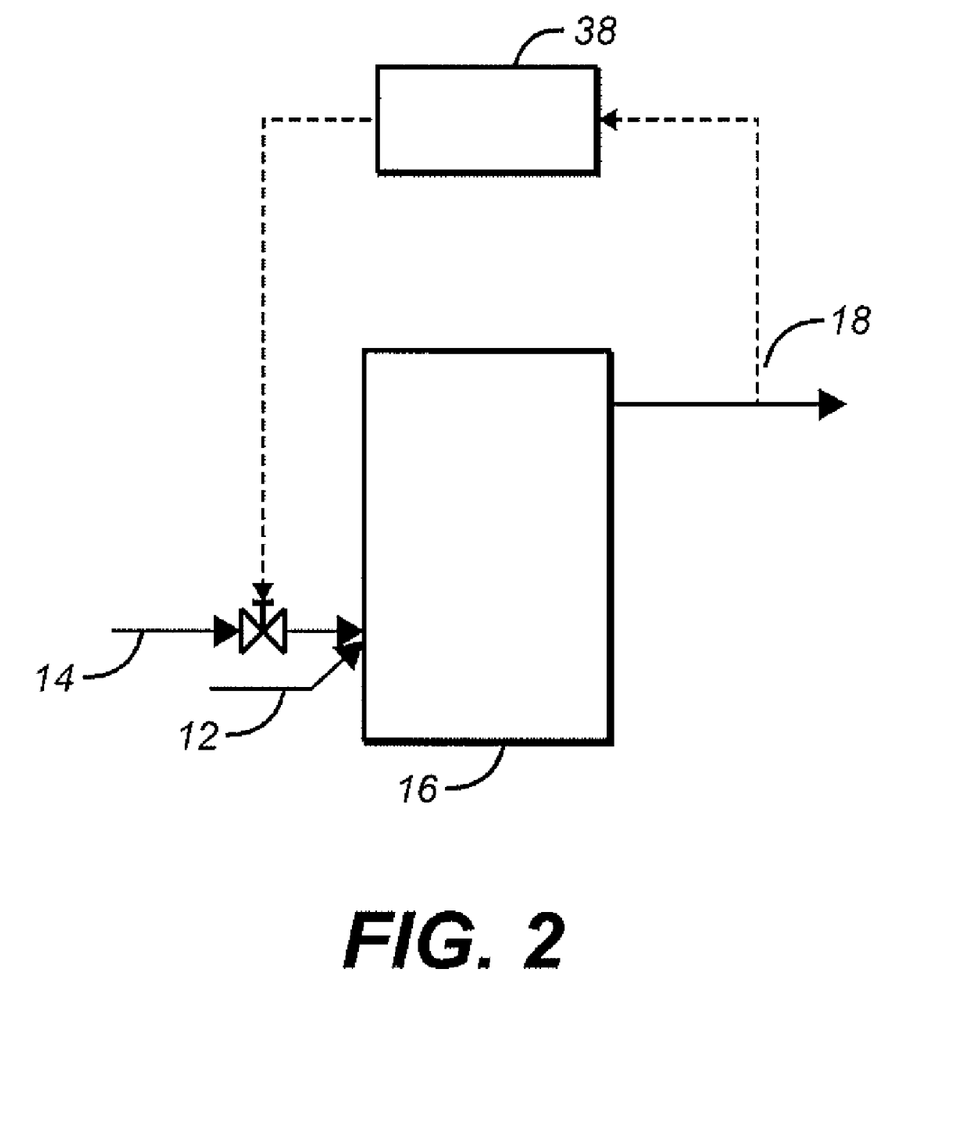
FIG. 2 is a schematic illustration of a burner control adapted to an oxygen enriched burner.
Figure 3:
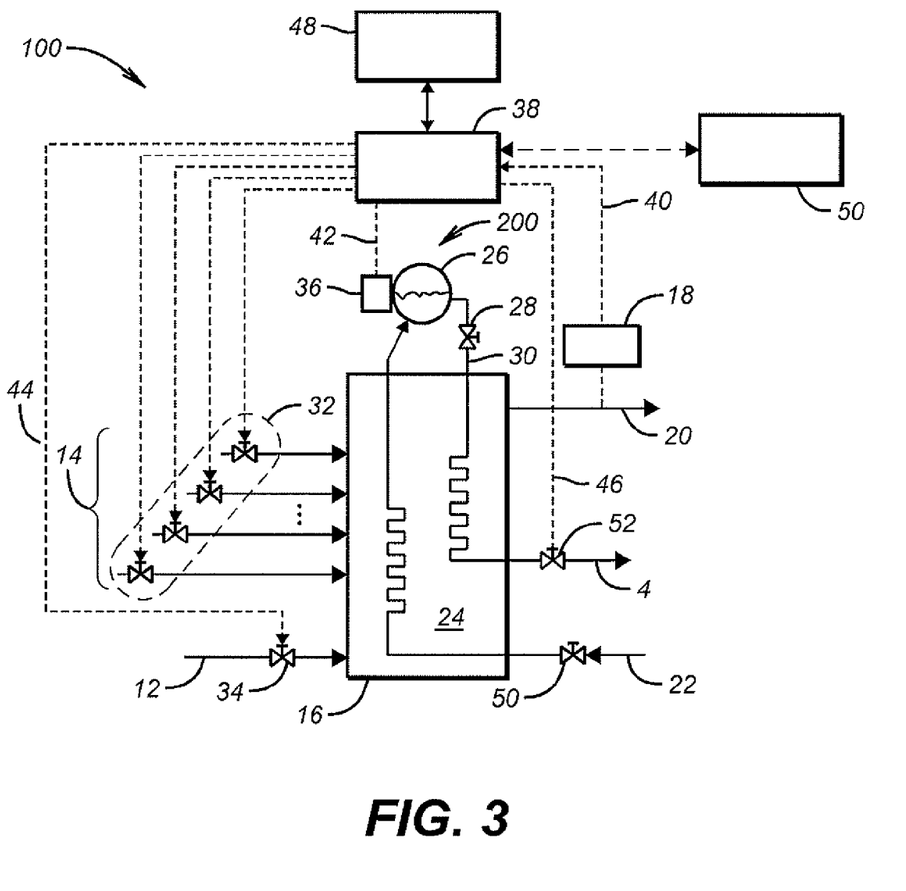
FIG. 3 is a schematic illustration of a first embodiment showing adaptation of the burner control to a retrofit application.

FIG. 2 shows a rudimentary control loop. The fuel inlet 12 provides fuel to the combustion chamber 16, the oxidant inlets 14 provide oxygen-enriched inlet stream to the combustion chamber 16, the combustion chamber 16 burns the fuel and the flue gas composition detector 18 measures at least one characteristic of the flue gas, provides the data to the controller 38, which then adjusts the oxidant inlet 14 to effect desired control of the combustion process.

As illustrated in FIG. 3, the steam subassembly is not shown. However, the steam subassembly of the preferred embodiment is similar to that shown in FIG. 1, in which the steam subassembly 200 has a supply water inlet 22, a heat exchange zone 24, a water drum 26, a steam quality actuator 28 and a steam outlet 30. The supply water inlet 22 provides feed water to the heat exchange zone 24, the heat exchange zone 24 transfers heat generated by combustion of the fuel to the water to generate steam, the water drum 26 receives the heated water and steam from the heat transfer zone 24 and maintains the water and steam at a selected steam pressure and water level, and the steam quality actuator 28 regulates at least one characteristic of the steam. Characteristics of steam "quality" generally include the desired flow rate at a certain steam temperature (T) and pressure (P).

Note that, as shown in FIG. 3, multiple inlets 14 are shown. These are often used in combustion processes and can include primary air, secondary air and tertiary air, to provide multiple combustion zones to ensure complete combustion of the fuel while at the same time providing minimal $NO_x$ production. Oxygen enrichment to these multiple streams can be provided, either to all of them or only to select streams among them. Control of the combustion process thereby accommodates these multiple oxygen enriched streams, and varies the extent of oxygen enrichment among them to achieve optimum operating conditions.

Referring again to FIG. 3, as illustrated, a first preferred embodiment provides oxygen enrichment in multiple air inlet streams 14. The oxygen-containing inlet streams 14 have inlet stream actuators 32 that regulate the rate of oxygen being introduced into the combustion chamber. These can accomplish the oxygen control either by varying the flowrate of enriched air, the oxygen concentration of enriched air, or both, to effect changes in the total amount of $O_2$ entering at each inlet 14. The fuel inlet 12 has a fuel inlet actuator 34 that regulates the rate of fuel being introduced into the combustion chamber 16. Generally, the fuel is varied as needs are defined by the demand for steam. A water drum condition monitor 36 monitors at least one characteristic found in the water drum 26. These conditions can be at least one of the water level, drum temperature and drum pressure in the water drum. The monitor 36 then generates water drum data which can be relayed to either a combustion controller working in concert with existing controls or with an advanced or multivariable controller. As shown, a combustion controller 38 is provided having a flue gas data input 40, a water drum data input 42, a combustion control output 44 and a steam control output 46.

Flue gas data and water drum data are used by the combustion controller 38 to control the combustion process. The combustion control output 44 controls the inlet stream controller 32, the fuel inlet actuator 34 and the steam quality actuator 28 to optimize combustion of the fuel and production of steam having the desired quality.

Describing in more detail the operation of the preferred embodiment in a coal-fired boiler, a fuel source, such as coal, is supplied with or without an oxygen-enriched gas in a boiler. The amount of fuel (coal) and oxygen-enriched air in the primary inlet is specified by the user requirements of steam. A series of multiple oxygen-enriched flows in different places of the boiler improve the performance of the boiler, adding flexibility, and are controlled by a controller to optimize combustion. The concentration of flue gases are measured on-line by on-line analyzers and this information is sent to the controller for real-time adjustment. In a preferred embodiment adapted for use as retrofit technology, the controller interacts with the existing control system to compensate for the changes caused by the oxygen enrichment.

Note that in these examples where oxygen enrichment is employed to control the flue gas emissions, e.g., $NO_x$, a change in the oxygen content of the oxidant streams results in a change in the flowrate of oxidant streams (holding the total oxygen to be introduced into the combustion chamber constant). This change in oxidant flowrate changes the heat transfer characteristics of the boiler. Thus, a change in the oxygen content of the various streams, traditionally as a result of instructions from a flue gas controller, has an effect on the boiler. By providing an advanced controller, such as a feed-forward controller, multivariable predictive controller, etc., the change in boiler characteristics can be anticipated, rather than observed, and control of the boiler is made more efficient. By improving the efficiency of the boiler, the required amount of energy by combustion can be decreased which, of course, has an effect on the combustion control. As one can see, these are integrally related, and the preferred embodiments herein provide a way to better control the process as an interrelated phenomenon.

The complex nature of coal-fired boilers often requires the use of an advanced multivariable controller. The controller can be any advanced model-based or input/output-based controller and not only restricted to neural network controller, fuzzy controller, nonlinear sliding controller, model predictive controller, robust controller, etc. The advanced controller is capable of handling the multivariable, nonlinear and coupling nature between all the different variables. Furthermore, the controller is capable of rejecting the disturbances inherent in the variations of the fuel properties that affect the performance of the boiler, such as moisture and density variations. In addition, the controller can change the process operating conditions to ensure smooth load changes in the boiler and estimate the best time-dependent oxygen-enhanced profile or distribution of oxygen in the plurality of oxygen injections to ensure the best performance. The preferred embodiment is therefore applicable to any coal-boiler plants supplied by oxidant streams, including those utilizing pure or nearly pure oxygen. The "oxygen-enriched" oxidant means any oxidant streams containing more than 21% and up to 100% oxygen. This can also be used in cases where the oxidant injections are diluted, as it can be in the recirculation of flue gases, which reduces the oxygen content to less than 21%. In case the coal-boiler involves some flue gas recirculation, the controller can also calculate the required recirculation rate and help to stabilize the whole system.

Referring again to FIG. 3, the controller 38 set points are defined by a higher-level optimizer 48 which has access to all the information from the controller 38. The real-time optimizer 48 evaluates the performance of the boiler at all times and calculates new set points for the controller, thereby maintaining the boiler at its maximum efficiency by considering the dynamic changes in the system and reacting to them. Again, as shown in FIG. 3, the controller 38 works in conjunction with the already-placed or existing control system 50.

Figure 4:
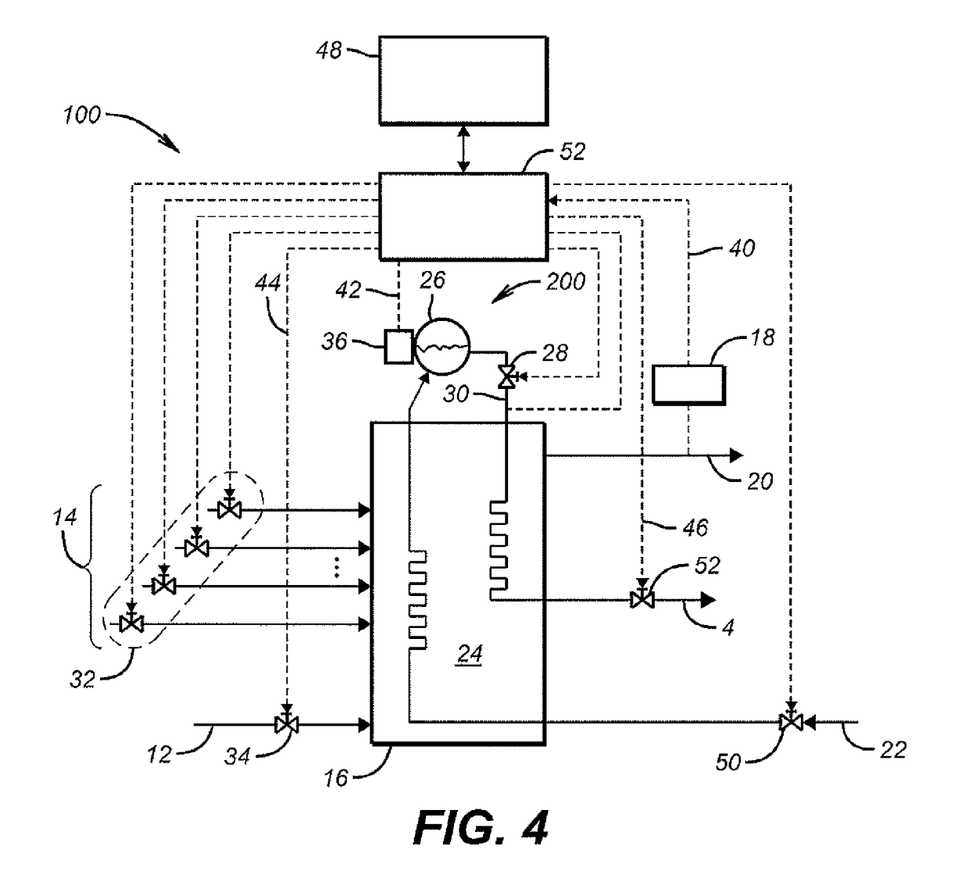
FIG. 4 is a schematic illustration of a second embodiment showing adaptation of the burner control in a new application.

Referring now to FIG. 4, a preferred embodiment constructed for use in a new boiler, such as a new coal fired boiler, is illustrated. At least one oxidant injection is provided, and is controlled with a multivariable controller regulating a wider variety of variables. FIG. 4 shows another preferred embodiment as adapted for use in a new coal fired boiler.

In a new boiler 10, a single, omnibus controller 52 monitors the flue gas composition as well as other boiler parameters such as the boiler pressure, water drum pressure and water drum level, etc. The controller 52 is an advanced or multivariable controller, which then regulates the multiplicity of oxidant inlet 14 injections, along with the feed water 22, the steam control output 46 and the boiler draft to vary the boiler pressure. The fuel inlet 12, introducing a fuel such as coal, is controlled as demand is specified by the user's power demand. As in the retrofit case, the controller 52 is any type of advanced multivariable controller, and the boiler performance is continuously monitored and maintained at optimum conditions through the optimizer 48.

In the preferred embodiments, the flue gases that are typically monitored include $O_2$, $NO_x$, $SO_x$, and CO. The temperature of the flue gases is also monitored. The manipulating (input) variables are the various oxidant flow rates, and the compensation signals to the other boiler manipulations such as feed water, draft and fuel. The optimizer 54 can optimize the flue gas composition based on economic criteria, or boiler performance based on heat transfer efficiency.

Figure 5:
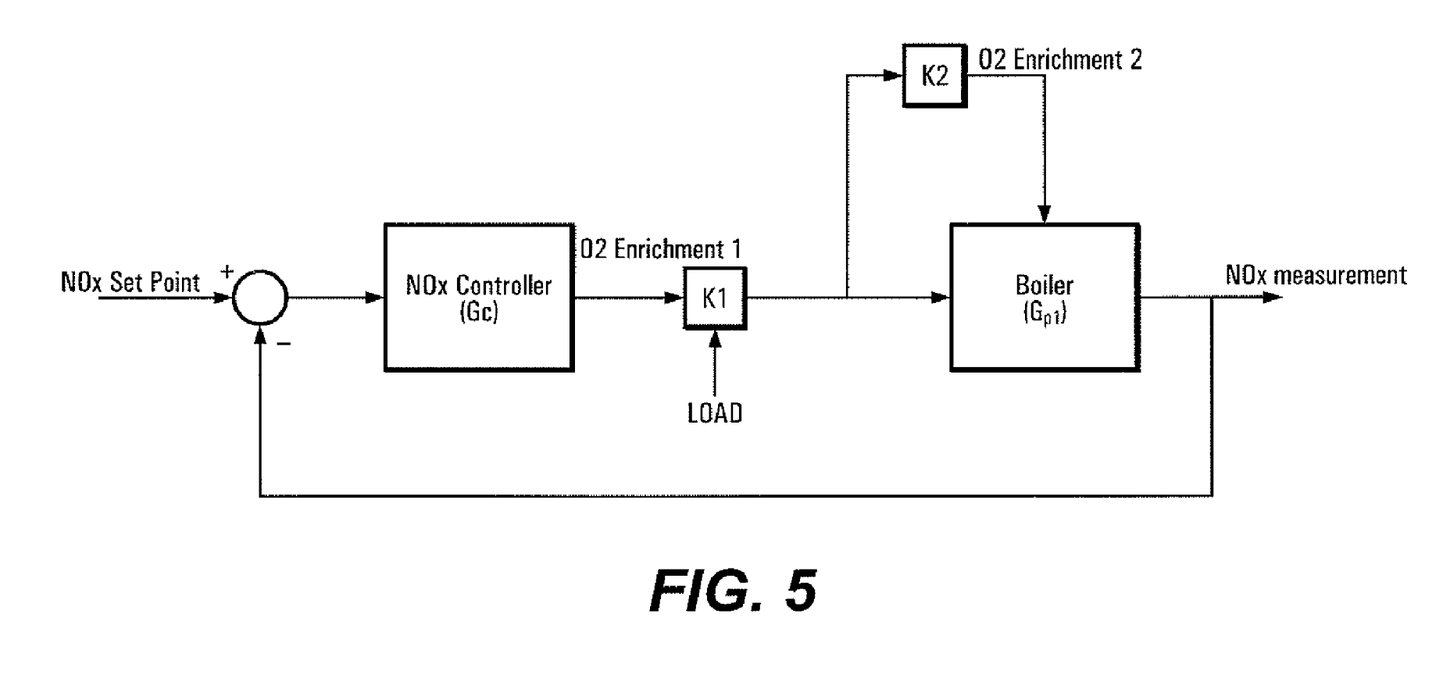
FIG. 5 is a block diagram of the process controller adaptable to the preferred embodiments shown in the previous figures.

As an example, a boiler is enriched with an oxidant in the primary air. The primary air is the oxidant in direct contact with the fuel right before combusting in the boiler. The variation of oxidant in the primary is utilized to change the oxidant in the secondary air. The secondary air (SA) is the oxidant entering the boiler through the burner but not in contact with the fuel. In the area of process control, the block diagram is shown in FIG. 5. The controller utilized the measurements of the flue gases, such as the $NO_x$ concentration, and calculated the oxygen going to the primary air (PA).

Figure 6:
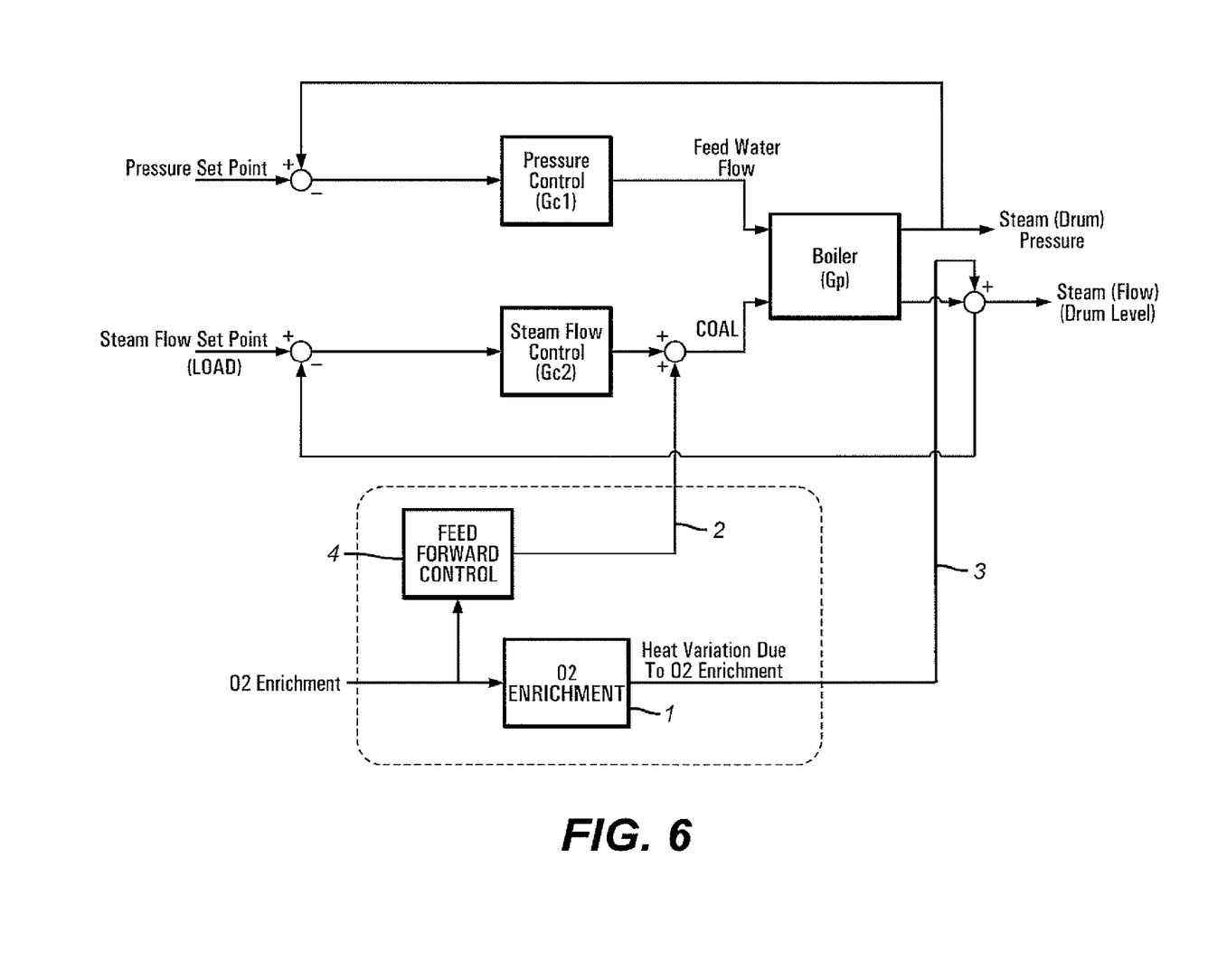
FIG. 6 is a block diagram showing interlinking of the burner control with the steam control.

This example is a retrofit technology, so as shown in FIG. 3, the controller has to interact with the customer's control system 50, to modify the oxidant in the secondary air (SA). The control system in FIG. 4 ensures minimizing the emissions and maintaining the desired level. Besides the interaction to balance the total oxidant to the boiler, the control system needs to interact with the customer's control system as shown in FIG. 6. The oxygen enrichment in coal-fired boilers reduces the flue gas emissions and has some effect in the boiler operation.

FIG. 6 illustrates an example of an embodiment constructed and arranged to compensate the drum pressure of the customer's control system when using oxygen enrichment. The oxygen enrichment, 1, can impact the water drum pressure, 3. The value of oxygen injected is utilized by an advanced controller, such as a feedforward controller, 4, to compensate the existing control actions.

An example of controlling a boiler with a multiplicity of oxidant injections is provided by the following procedure. The process thus described illustrates an example of performing multivariable control to accommodate shifting process conditions.

First, model identification is performed. The objective of this step is to build mathematical relationships between the inputs and the outputs. In this step, a series of step changes for each one of the oxidant injects, are made in a systematic way and the changes for all the variables (flue gas compositions and temperature, drum pressure and level, and boiler pressure) are dynamically recorded. In these experiments, only the oxidants are varied, keeping the total stoichiometry, feed water flow rate, steam flow rate and fuel flow rate constant. These results will show the impact of the oxidants alone on all the output variables. The dynamic data are analyzed with multivariable dynamic to estimate the parameters of the responses, such as the gain and the time constant. The parameter estimation techniques utilize squared error minimization techniques. The best model can be of the form $$G_{i,j} = \frac{K_{i,j}}{\tau_{i,j}s + 1}$$

$G_{i,j}$ represents the model interaction (known as transfer model) between the oxidant injection in position "i" and the output "j". The gain $K_{i,j}$ is the magnitude of the change that the oxidant in position "i" affect the output variable "j", and the time constant $\tau_{i,j}$ ($tao_{i,j}$), is a measure of how fast the output "j", responds to a change in the input "i". At the end of the identification step, a matrix of transfer models of all the inputs to all the outputs is obtained.

Figure 7:
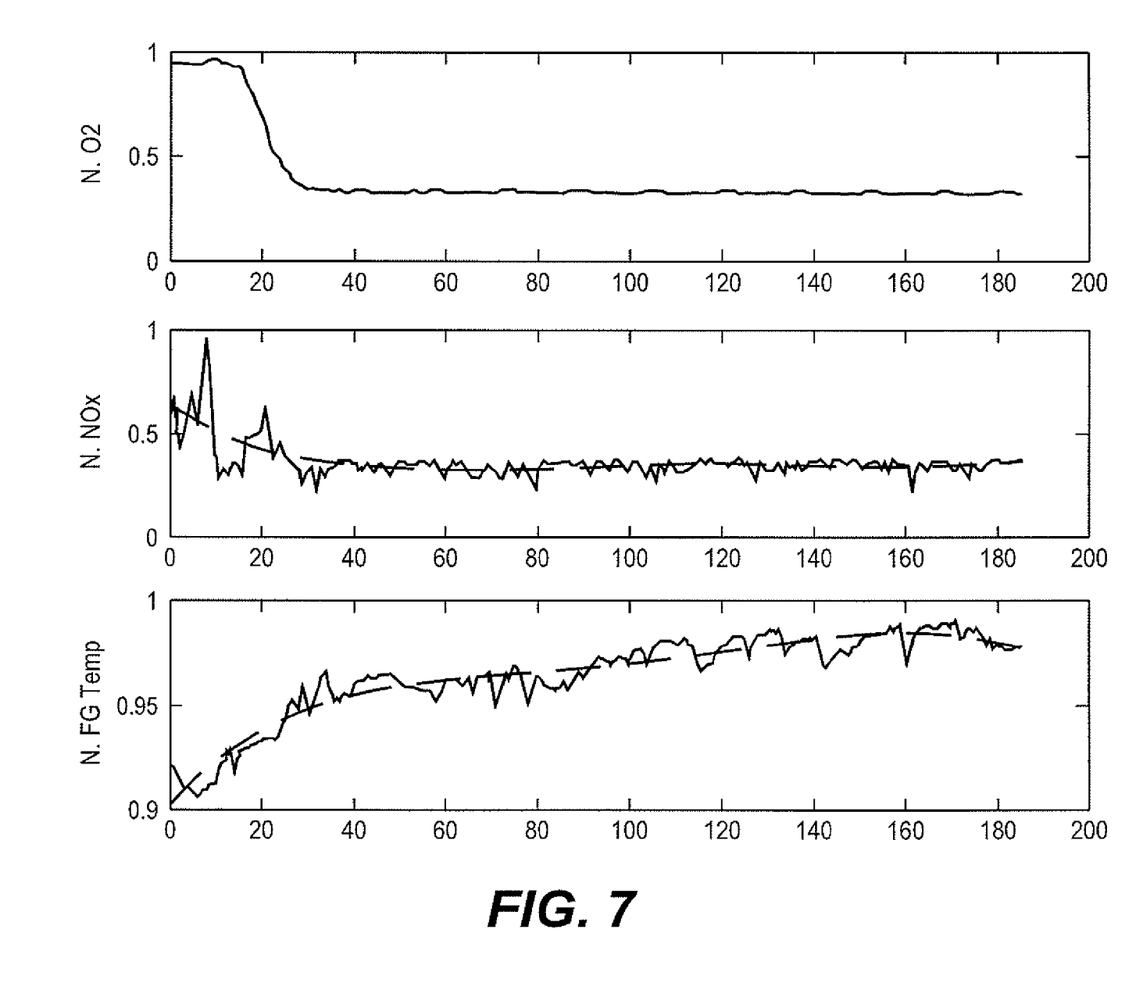
FIG. 7 is an illustration of data showing the effects of process control on boiler variables.

FIG. 7 illustrates expected data showing the normalized change in the oxidant in the primary air and the normalized response changes of $NO_x$ in the flue gases and the flue gas temperature. It can be seen in FIG. 7 that the oxygen in PA has an effect on more than one variable. This is known to be an interacting system, whose control is not so obvious.

From this example, an identification result between the O2 in primary air and the $NO_x$ concentration in the flue gases is $$G_{1,2}(s) = \frac{K_{1,2}}{\tau_{1,2}s + 1} = \frac{1.264}{15s + 1}$$

In designing the control with a multivariable controller, one approach is to consider a Linear Quadratic Controller (LQC). This controller consist of the set of actions to the oxidant inputs (u1, u2, . . . ), or in vector form $\underline{u}$, that minimizes some criterion. The LQC minimizes the deviation from desired values control outputs, while minimizing the use of specific inputs. In general, the minimization criterion can be written as $$J = \Sigma(\underline{y}^T Q \underline{y} + \underline{u}^T R \underline{u})$$

The vector y represents the boiler output errors, and u represents the vector of boiler inputs. The controller will minimize the index criterion J, which is the sum of all the deviations of the outputs from the set points (errors), and the manipulations u. In this embodiment, the matrices Q and R represent used defined weights. Q weights the importance on the control outputs. For instance, if it is more important to maintain a tighter control in the $NO_x$ emission error, e.g. y1, than on the boiler pressure error, y2, then the weight element q1 should be higher than q2. Similarly for the inputs, if it is determined or expected that oxidant in the primary air has a bigger impact on the $NO_x$ emission, and so it is preferred to use this oxidant, a smaller weight coefficient r is used for this oxidant.

Thus, an oxygen enriched combustion boiler is described. The boiler has a burner subassembly having a fuel inlet, a primary oxidant inlet, a secondary oxidant inlet, a combustion chamber, a flue gas composition detector and a flue gas outlet. The fuel inlet is constructed and arranged to provide fuel to the combustion chamber. The primary oxidant inlet is constructed and arranged to provide an oxygen-containing inlet stream to the combustion chamber at a location near the fuel inlet, so the oxidant and the fuel are substantially mixed before or immediately upon entering the combustion chamber, thereby defining a first combustion zone. The secondary oxidant inlet is constructed and arranged to provide a secondary oxygen-containing inlet stream to the combustion chamber at a location sufficiently removed from the fuel inlet, to define a second combustion zone.

The combustion chamber is constructed and arranged to burn the fuel, thereby producing heat and a flue gas having characteristics including CO composition, $NO_x$ composition, $O_2$ composition, and temperature. The flue gas composition detector is constructed and arranged to measure at least one characteristic of the flue gas and generate flue gas data. The flue gas outlet is constructed and arranged to exhaust the flue gas from the combustion chamber.

A steam subassembly having a supply water inlet, a heat exchange zone, a water drum, a steam quality actuator and a steam outlet is provided. The supply water inlet is constructed and arranged to provide feed water to the heat exchange zone. The heat exchange zone is constructed and arranged to transfer at least a portion of the heat generated by combustion of the fuel to the water and generate steam having characteristics including steam temperature and steam pressure. The water drum is constructed and arranged to receive the heated water and steam from the heat transfer zone and maintain water and steam in the drum at a selected steam pressure and water level. The steam outlet is constructed and arranged to transfer steam from the water drum and transport it out of the steam subassembly. The steam quality actuator is constructed and arranged to regulate at least one characteristic of the steam.

The primary oxidant inlet has a first inlet stream actuator constructed and arranged to regulate the rate of oxygen being introduced into the combustion chamber at the primary inlet, by varying the flowrate of oxidant, varying the oxygen content of the oxidant stream, or both. The secondary oxidant inlet has a second inlet stream actuator constructed and arranged to regulate the rate of oxygen being introduced into the combustion chamber at the secondary inlet, by varying the flowrate of oxidant, varying the oxygen content of the oxidant stream, or both. The fuel inlet has a fuel inlet actuator constructed and arranged to regulate the rate of fuel being introduced into the combustion chamber. The primary oxidant, the secondary oxidant, and other oxidants can be controlled by one multivariable controller, as described in the example, or they can be controlled by independent controllers.

A water drum condition monitor is constructed and arranged to monitor the water level and at least one of the temperature and pressure in the water drum and generate water drum data. A combustion controller having a flue gas data input, a water drum data input, a combustion control output and a steam control output is provided, and is constructed and arranged to perform multivariable control to accommodate shifting process conditions utilizing the flue gas data and the water drum data to generate combustion control output and steam control output.

The flue gas data input receives the flue gas data, the water drum data input receives the water drum data, the combustion controller compares the data and performs the multivariable control to accommodate shifting process conditions, thereby selecting the combustion control output and the steam control output. The combustion control output is operatively associated with the primary inlet stream actuator, the secondary inlet stream actuator, the fuel inlet actuator and the steam quality actuator to optimize combustion of the fuel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A boiler comprising, in combination:
a burner subassembly having a fuel inlet, an oxidant inlet, a combustion chamber, a flue gas composition detector and a flue gas outlet, the fuel inlet constructed and arranged to provide fuel to the combustion chamber, the oxidant inlet constructed and arranged to provide an oxygen-containing inlet stream to the combustion chamber, the combustion chamber constructed and arranged to burn the fuel thereby producing heat and a flue gas having characteristics including CO composition, $NO_x$ composition, $O_2$ composition, and temperature, the flue gas composition detector constructed and arranged to measure at least one characteristic of the flue gas and generate flue gas data, and the flue gas outlet constructed and arranged to exhaust the flue gas from the combustion chamber;

a steam subassembly having a supply water inlet, a heat exchange zone, a water drum, a steam quality actuator and a steam outlet, the supply water inlet constructed and arranged to provide feed water to the heat exchange zone, the heat exchange zone constructed and arranged to transfer at least a portion of the heat generated by combustion of the fuel to the water and generate steam having characteristics including steam temperature and steam pressure, the water drum constructed and arranged to receive the heated water and steam from the heat transfer zone and maintain water and steam in the drum at a selected steam pressure and water level, the steam outlet constructed and arranged to transfer steam from the water drum and transport it out of the steam subassembly, and the steam quality actuator constructed and arranged to regulate at least one characteristic of the steam;

the oxygen-containing inlet stream having an inlet stream actuator constructed and arranged to regulate the rate of oxygen being introduced into the combustion chamber;

the fuel inlet having a fuel inlet actuator constructed and arranged to regulate the rate of fuel being introduced into the combustion chamber;

a water drum condition monitor constructed and arranged to monitor the water level and at least one of the temperature and pressure in the water drum and generate water drum data;

a combustion controller having a flue gas data input, a water drum data input, a combustion control output and a steam control output;

the flue gas data input receiving the flue gas data, the water drum data input receiving the water drum data, the combustion controller comparing the data and selecting the combustion control output and the steam control output;

the combustion control output operatively associated with the inlet stream actuator, the fuel inlet actuator and the steam quality actuator to optimize combustion of the fuel.

2. The boiler of claim 1, wherein the flue gas data comprises information regarding flue gas characteristics including at least one of $O_2$, $NO_x$, $SO_x$, $H_2O$, CO, $CO_2$ and $T_{fg}$.

3. The boiler of claim 1, wherein the flue gas data comprises information regarding flue gas characteristics including at least one characteristic from which at least one of $O_2$, $NO_x$, $SO_x$, $H_2O$, CO, $CO_2$ and $T_{fg}$ can be deduced.

4. The boiler of claim 1, the oxidant inlet stream actuator being constructed and arranged to regulate the amount of oxygen flowrate by varying the oxygen content of the oxidant stream.

5. The boiler of claim 4, the oxidant inlet stream actuator being constructed and arranged to regulate the amount of oxygen flowrate by varying the flowrate of oxidant in the oxidant stream.

6. The boiler of claim 1, the oxidant inlet stream actuator being constructed and arranged to regulate the amount of oxygen flowrate by varying the flowrate of oxidant in the oxidant stream.

7. A boiler comprising, in combination:
a burner subassembly having a fuel inlet, a primary oxidant inlet, a secondary oxidant inlet, a combustion chamber, a flue gas composition detector and a flue gas outlet, the fuel inlet constructed and arranged to provide fuel to the combustion chamber, the primary oxidant inlet constructed and arranged to provide an oxygen-containing inlet stream to the combustion chamber at a location near the fuel inlet so that the oxidant and the fuel are substantially mixed before or immediately upon entering the combustion chamber, thereby defining a first combustion zone, the secondary oxidant inlet constructed and arranged to provide a secondary oxygen-containing inlet stream to the combustion chamber at a location sufficiently removed from the fuel inlet to define a second combustion zone, the combustion chamber constructed and arranged to burn the fuel thereby producing heat and a flue gas having characteristics including CO composition, $NO_x$ composition, $O_2$ composition, and temperature, the flue gas composition detector constructed and arranged to measure at least one characteristic of the flue gas and generate flue gas data, and the flue gas outlet constructed and arranged to exhaust the flue gas from the combustion chamber;

a steam subassembly having a supply water inlet, a heat exchange zone, a water drum, a steam quality actuator and a steam outlet, the supply water inlet constructed and arranged to provide feed water to the heat exchange zone, the heat exchange zone constructed and arranged to transfer at least a portion of the heat generated by combustion of the fuel to the water and generate steam having characteristics including steam temperature and steam pressure, the water drum constructed and arranged to receive the heated water and steam from the heat transfer zone and maintain water and steam in the drum at a selected steam pressure and water level, the steam outlet constructed and arranged to transfer steam from the water drum and transport it out of the steam subassembly, and the steam quality actuator constructed and arranged to regulate at least one characteristic of the steam;

the primary oxidant inlet having a first inlet stream actuator constructed and arranged to regulate the rate of oxygen being introduced into the combustion chamber at the primary inlet;

the secondary oxidant inlet having a second inlet stream actuator constructed and arranged to regulate the rate of oxygen being introduced into the combustion chamber at the secondary inlet;

the fuel inlet having a fuel inlet actuator constructed and arranged to regulate the rate of fuel being introduced into the combustion chamber;

a water drum condition monitor constructed and arranged to monitor the water level and at least one of the temperature and pressure in the water drum and generate water drum data;

a combustion controller having a flue gas data input, a water drum data input, a combustion control output and a steam control output, and being constructed and arranged to perform control to accommodate shifting process conditions utilizing the flue gas data and the water drum data to generate combustion control output and steam control output;

the flue gas data input receiving the flue gas data, the water drum data input receiving the water drum data, the combustion controller comparing the data and performing the control to accommodate shifting process conditions, thereby selecting the combustion control output and the steam control output; and the combustion control output operatively associated with the primary inlet stream actuator, the secondary inlet stream actuator, the fuel inlet actuator and the steam quality actuator to optimize combustion of the fuel.

8. The boiler of claim 7, wherein the flue gas data comprises information regarding flue gas characteristics including at least one of $O_2$, $NO_x$, $SO_x$, $H_2O$, CO, $CO_2$ and $T_{fg}$.

9. The boiler of claim 7, wherein the flue gas data comprises information regarding flue gas characteristics including at least one characteristic from which at least one of $O_2$, $NO_x$, $SO_x$, $H_2O$, CO, $CO_2$ and $T_{fg}$ can be deduced.

10. The boiler of claim 7, the primary oxidant inlet stream actuator being constructed and arranged to regulate the amount of oxygen flowrate by varying the oxygen content of the oxidant stream.

11. The boiler of claim 7, the secondary oxidant inlet stream actuator being constructed and arranged to regulate the amount of oxygen flowrate by varying the oxygen content of the oxidant stream.

12. The boiler of claim 7, the primary oxidant inlet stream actuator being constructed and arranged to regulate the amount of oxygen flowrate by varying the flowrate of oxidant in the oxidant stream.

13. The boiler of claim 7, the secondary oxidant inlet stream actuator being constructed and arranged to regulate the amount of oxygen flowrate by varying the flowrate of oxidant in the oxidant stream.

14. The boiler of claim 7, wherein the burner subassembly further comprises a tertiary oxidant inlet constructed and arranged to provide a tertiary oxygen-containing inlet stream to the combustion chamber at a location sufficiently removed from the fuel inlet and the secondary inlet to define a third combustion zone, the tertiary oxidant inlet having a third inlet stream actuator constructed and arranged to regulate the rate of oxygen being introduced into the combustion chamber at the tertiary inlet;

the combustion control output operatively associated with the tertiary inlet stream actuator to optimize combustion of the fuel.

15. The boiler of claim 7, wherein the combustion controller is constructed and arranged to perform advanced control to accommodate shifting process conditions utilizing the flue gas data and the water drum data to generate combustion control output and steam control output, the combustion controller comparing the data and performing the advanced control to accommodate shifting process conditions, thereby selecting the combustion control output and the steam control output.

16. The boiler of claim 15, wherein the combustion controller is constructed and arranged to perform multivariable control to accommodate shifting process conditions utilizing the flue gas data and the water drum data to generate combustion control output and steam control output, the combustion controller comparing the data and performing the multivariable control to accommodate shifting process conditions, thereby selecting the combustion control output and the steam control output.

* * * * *